US008489724B2

(12) United States Patent
Ghosh

(10) Patent No.: US 8,489,724 B2
(45) Date of Patent: Jul. 16, 2013

(54) CNAME-BASED ROUND-TRIP TIME MEASUREMENT IN A CONTENT DELIVERY NETWORK

(75) Inventor: Arijit Ghosh, San Jose, CA (US)

(73) Assignee: CDNetworks Co., Ltd., Seoul (KR)

( * ) Notice: Subject to any disclaimer, the term of this patent is extended or adjusted under 35 U.S.C. 154(b) by 230 days.

(21) Appl. No.: 12/882,088

(22) Filed: Sep. 14, 2010

(65) Prior Publication Data

US 2012/0066360 A1   Mar. 15, 2012

(51) Int. Cl.
*G06F 15/173* (2006.01)

(52) U.S. Cl.
USPC .......................................................... 709/223

(58) Field of Classification Search
USPC ........................... 709/223, 230, 350, 229, 235
See application file for complete search history.

(56) References Cited

U.S. PATENT DOCUMENTS

| | | | |
|---|---|---|---|
| 6,115,752 A | 9/2000 | Chauhan | |
| 6,754,706 B1 | 6/2004 | Swildens et al. | |
| 7,058,706 B1 | 6/2006 | Iyer et al. | |
| 7,165,116 B2 | 1/2007 | Grove et al. | |
| 7,340,505 B2 * | 3/2008 | Lisiecki et al. | 709/217 |
| 7,523,181 B2 | 4/2009 | Swildens et al. | |
| 7,660,896 B1 * | 2/2010 | Davis et al. | 709/226 |
| 7,912,978 B2 * | 3/2011 | Swildens et al. | 709/235 |
| 7,987,291 B2 * | 7/2011 | Bogner | 709/245 |
| 8,117,296 B2 * | 2/2012 | Liu et al. | 709/223 |
| 8,122,102 B2 * | 2/2012 | Wein et al. | 709/219 |
| 8,171,019 B2 * | 5/2012 | Balogh | 707/722 |
| 8,261,351 B1 * | 9/2012 | Thornewell et al. | 726/23 |
| 2002/0154600 A1 * | 10/2002 | Ido et al. | 370/216 |
| 2009/0022581 A1 * | 1/2009 | Tries et al. | 415/163 |
| 2010/0023693 A1 * | 1/2010 | Dilley et al. | 711/118 |
| 2010/0088398 A1 * | 4/2010 | Plamondon | 709/220 |
| 2010/0121914 A1 * | 5/2010 | Jeon et al. | 709/203 |
| 2010/0250742 A1 * | 9/2010 | Leighton et al. | 709/224 |
| 2011/0153937 A1 * | 6/2011 | Annamalaisami et al. | 711/118 |
| 2011/0219108 A1 * | 9/2011 | Lisiecki et al. | 709/223 |
| 2011/0282973 A1 * | 11/2011 | Josefsberg et al. | 709/219 |
| 2011/0320524 A1 * | 12/2011 | Nandagopal | 709/203 |

* cited by examiner

*Primary Examiner* — Asad Nawaz
*Assistant Examiner* — Syed S Ali
(74) *Attorney, Agent, or Firm* — Fenwick & West LLP

(57) ABSTRACT

Round-trip time (RTT) for communication between an edge point of presence (POP) in a content delivery network (CDN) and a local domain name server (LDNS) is determined by resolution of a canonical name (CNAME) record. A first server in a first edge POP in a CDN receives a request to resolve a domain name from a LDNS and transmits a CNAME record including a timestamp indicating when the CNAME record was transmitted to the LDNS. The first server subsequently receives a request from the LDNS to resolve the CNAME record and determines a RTT time indicating the time needed for round-trip transmission between the LDNS and the first server based on the time when the request to resolve the CNAME request was received by the first server and the time indicated by the timestamp.

27 Claims, 8 Drawing Sheets

US 8,489,724 B2

CNAME-BASED ROUND-TRIP TIME MEASUREMENT IN A CONTENT DELIVERY NETWORK

BACKGROUND

1. Field of the Invention

The present invention relates to a content delivery network and, in particular, to determining round-trip time between a local domain name server and an edge point of presence in the content delivery network.

2. Description of the Related Art

A content delivery network (CDN) uses the round-trip time (RTT) between a local domain name server (LDNS) of a user and points of presence (POPs) within the CDN to direct user requests for content. Conventional methods for determining RTT time from a POP to a LDNS use one or more of ping, traceroute, reverse DNS lookup and opening a Transmission Control Protocol (TCP) connection. However, for many reasons, an LDNS may fail to respond to the conventionally used methods, preventing the CDN from obtaining RTT data. Further, some intermediate routers between an edge POP and a LDNS may fail to respond to conventional methods, preventing RTT data acquisition from the LDNS. For example, some routers may unconditionally drop traceroute requests, preventing data retrieval from the LDNS. Such inability of conventional methods to accurately calculate RTT between an edge POP and non-responsive LDNSes impairs CDN performance.

SUMMARY

According to various embodiments, the round-trip time (RTT) for communication between an edge point of presence (POP) in a content delivery network (CDN) and a local domain name server (LDNS) is calculated using resolution of canonical name (CNAME) records. A first server in a first edge POP in a CDN receives a request to resolve a domain name from a LDNS. Responsive to determining the first server does not include stored data describing RTT between the first edge POP and the LDNS, the first server transmits a CNAME record including a timestamp to the LDNS. The timestamp indicates a first time when the CNAME record is transmitted to the LDNS. The first server subsequently receives a request from the LDNS to resolve the CNAME record that includes the first time. The first server then determines a RTT time describing round-trip transmission time between the LDNS and the first server based on a second time when the first server received the request to resolve the CNAME record and the first time indicated by the timestamp. In one embodiment, the first server may store the RTT in association with data identifying a pair of the first edge POP and the LDNS, allowing the server to maintain a record of the RTT between the first edge POP and one or more LDNS'. The RTT information may also be propagated to other edge PoPs of the CDN.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. (FIG.) 1 illustrates the overall architecture of a content delivery network (CDN) in accordance with an embodiment of the present invention.

DETAILED DESCRIPTION OF EMBODIMENTS

Figure 1:
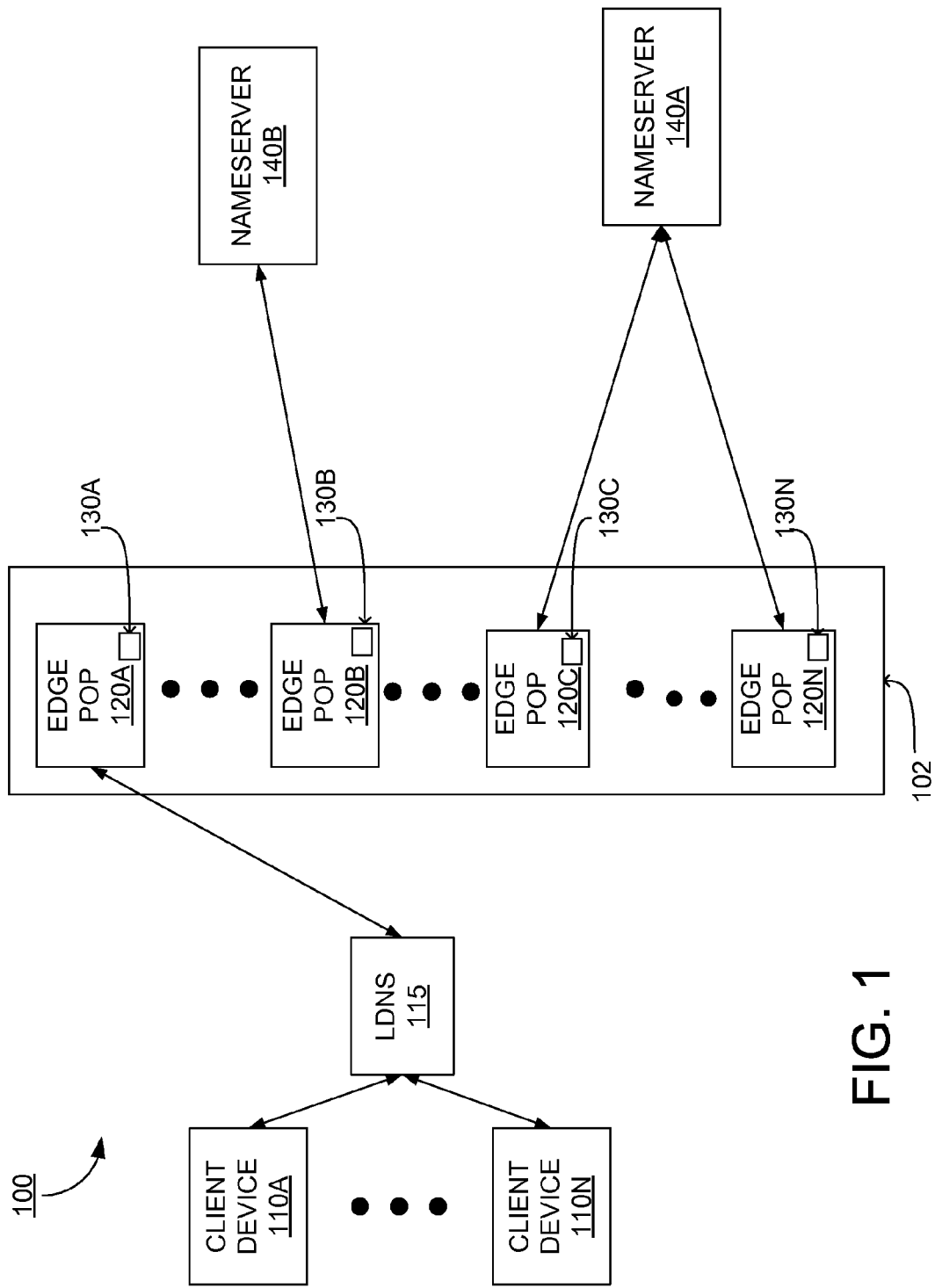

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention. Like reference numerals are used in the figures to identify like elements.

Reference will now be made in detail to several embodiments of the present invention(s), examples of which are illustrated in the accompanying Figures. It is noted that wherever practicable similar or like reference numbers may be used in the figures and may indicate similar or like functionality. The Figures depict embodiments of the present invention for purposes of illustration only. One skilled in the art will readily recognize from the following description that alternative embodiments of the structures and methods illustrated herein may be employed without departing from the principles of the invention described herein.

In general, embodiments of the present invention measure round-trip time (RTT) between an edge point of presence (edge POP) in a content delivery network (CDN) and a local domain name server (LDNS) used by a client device using resolution of a canonical name (CNAME) record. A CNAME record is a resource record used by a domain name system (DNS) specifying that one domain name is an alias of another domain name. To determine RTT between an edge POP and LDNS, an LDNS sends a request to resolve a domain name to a nameserver, which identifies an edge POP to resolve the domain name. After receiving the domain resolution request, the edge POP transmits a CNAME record back to the LDNS along with a timestamp indicating when the CNAME record was transmitted. After receiving the CNAME request, the LDNS transmits a request for resolution of the CNAME record to the edge POP, with the timestamp indicating the time when the CNAME record was transmitted included in the request. Upon receiving the request for resolution of the CNAME request, the edge POP determines a RTT between the LDNS and the edge POP using the time when the CNAME record was transmitted and the time when the request for resolution of the CNAME request is received by the edge POP. Including the timestamp indicating transmission of the CNAME record to the LDNS in the request for resolution of the CNAME record allows the edge POP to calculate RTT time using the request for resolution of the CNAME record, enabling the CDN to more accurately route user requests for content based on accurate RTT measurements between edge POPs and LDNS'.

Architectural Overview of a Content Delivery Network (CDN)

FIG. (FIG.) 1 illustrates the overall architecture of a system 100 for executing distributed applications using a content delivery network (CDN) 102 in accordance with one embodiment of the present invention. A CDN 102 comprises various data centers referred to herein as edge points of presence (edge POPs) 120A, 120B, 120C, 120N (individually or collectively also referred to with reference numeral 120) that are placed at various points in the network (e.g., the Internet) and store copies of data for access by client devices 110A, 110B (individually or collectively also referred to with reference numeral 110). While the example of FIG. 1 shows four edge POPs 120A, 120B, 120C, 120N, other embodiments of the CDN 102 may include a greater or fewer number of edge POPs 120. An edge POP 120 may also execute an application identified by a client device 110 and communicate data from the application to the client device 110.

The Doman Name System (DNS) is a hierarchical naming system for computing devices, services or any other resource coupled to a network, such as the Internet, that translates domain names understandable by humans into numerical identifiers, such as Internet Protocol (IP) addresses, used to locate and access devices coupled to the network. A distributed database system maintains the DNS using a plurality of nameservers 140A, 140B (also referred to collectively using reference numeral 140). The DNS delegates an authoritative nameserver 140 to a domain and the nameserver 140 assigns domain names and maps identifiers, such as IP addresses, to domain names. Thus, a nameserver 140 receives a request to resolve a domain name and returns an IP address, or other identifier, associated with a device, such as a computing device or server, within the domain that provides content.

Thus, to receive content, a client device 110 receives a domain name and communicates a request to resolve the domain name to a local domain name server (LDNS) 115. For example, the LDNS 125 is a computing device maintained by a network service provider. The LDNS 125 communicates a request to resolve the domain name to a nameserver 140A, 140B, which communicates an address of a global server load balancer (GSLB) 130 included in an edge POP 120A to the LDNS 115. Each edge POPs 120A, 120B, 120C, 120N includes a GSLB 130A, 130B, 130C, 130N, allowing each edge POP to resolve domain names from one or more client devices 110A, 110N. Thus, a nameserver 140 identifies a GSLB 120 to the LDNS 115, allowing the LDNS 115 to communicate requests for domain name resolution to the identified GSLB 130.

In one embodiment, the CDN 102 periodically performs latency measurements between the LDNS 115 and the various edge POPs 120A, 120B, 120C, 120N. In the embodiments of the present invention, a GSLB 130 included in an edge POP 120 communicates a canonical name (CNAME) record to the LDNS 115 and uses resolution of the CNAME record to determine the round-trip time (RTT) for communication between the LDNS 115 and the edge POP 120. Determination of RTT from CNAME record resolution is further described below in conjunction with FIGS. 3-5.

Figure 2A:
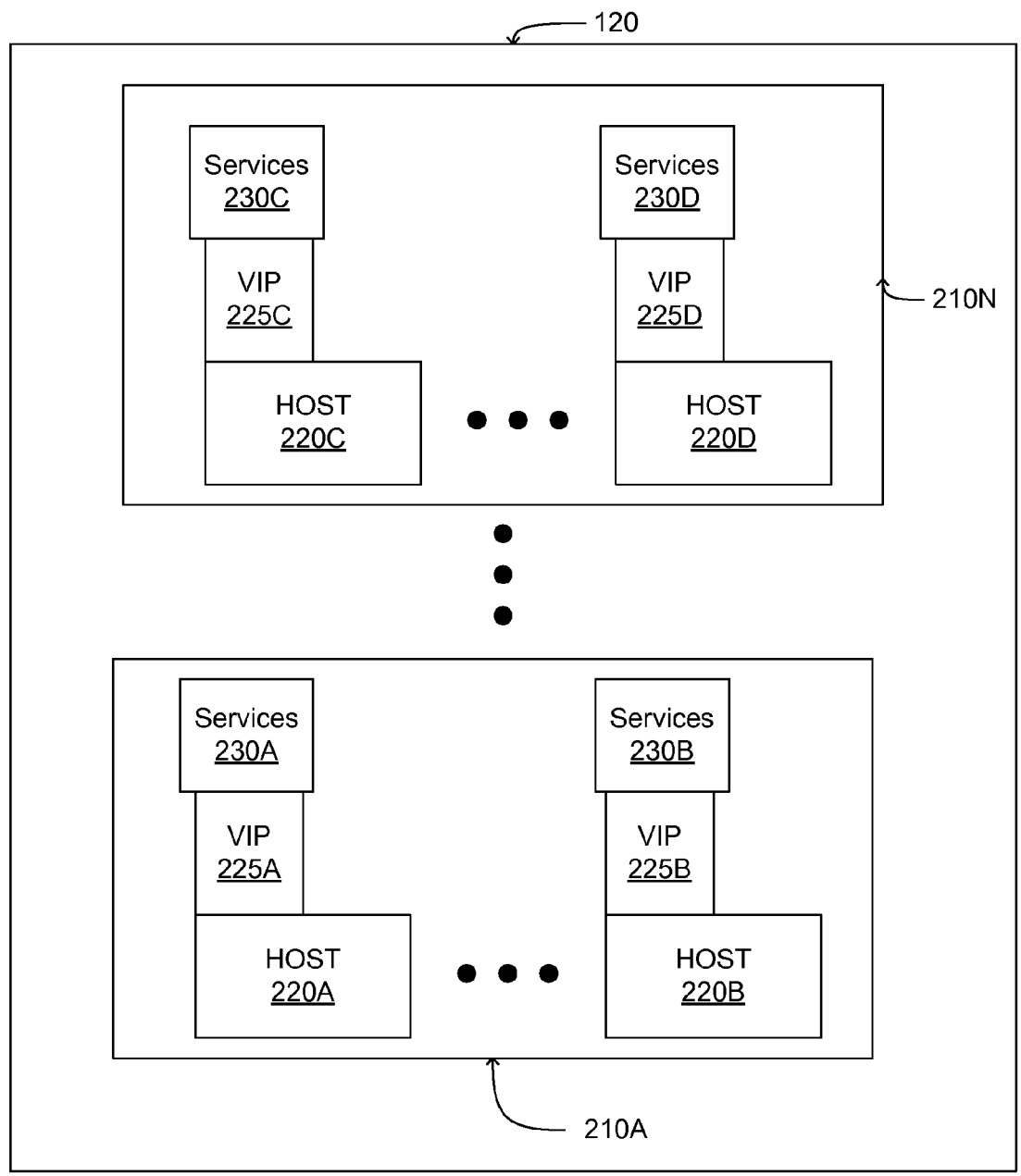
FIG. 2A illustrates the architecture of an edge point of presence (POP) in accordance with an embodiment of the present invention.

FIG. 2A illustrates the architecture of an edge POP 120 in a CDN 102. Each edge POP 120 includes multiple servers 210A, 210N. For purposes of illustration, FIG. 2A depicts two servers 210A, 210N (individually or collectively also referred to with reference numeral 210) in an edge POP 120. Each server 210 is a computing device having one or more processors and one or more storage devices, or other computer readable storage media, so that a server 210 has data storage and data processing functionality. The one or more processors in each server 210 execute instructions or other executable code form a computer-readable storage medium to implement one or more hosts 220A, 220B, 220C, 220D (individually or collectively also referred to with reference numeral 220). In one embodiment, each of the hosts 220A, 220B, 220C, 220D is a virtual machine (VM) running on the servers 210, so implementing multiple hosts 220 allows a server 210 to emulate operation of multiple types of computing devices. The hosts 220A, 220B, 220C, 220D read data from one or more storage devices or write data to a storage device of the servers 210. For purposes of illustration, FIG. 2A shows server 210A implementing two hosts 220A, 220B and server 210B implementing two hosts 220C, 220D; however, in other embodiments each server 210A, 210B may implement a greater or lesser number of hosts 220. The architecture of a server 210 is further described below in conjunction with FIG. 6.

Each VM host 220 includes one or more virtual Internet Protocol addresses (VIPs) 225A, 225B, 225C, 225D (also referred to individually or collective with reference numeral 225), or other virtual network addresses, through which one or more services 230A, 230B, 230C, and 230D (individually or collectively also referred to with reference numeral 230) are executed on the VM host 220, further described below in conjunction with FIG. 2B, manipulating stored data or received data. The VIPs 225 allow a network interface included in the server 210 to transmit and receive data using multiple IP addresses. For illustration, FIG. 2A shows a single VIP 225A, 225B, 225C, 225D included in each host 220A, 220B, 220C, 220D; however, in various embodiments, each host 220A, 220B, 220C, 220D may include a larger number of VIPs 225 and each host may include a different number of VIPs 225. Using VIPs 225 to execute services 230 such as applications on the VM hosts allows more efficient use of server 210 resources.

Figure 2B:
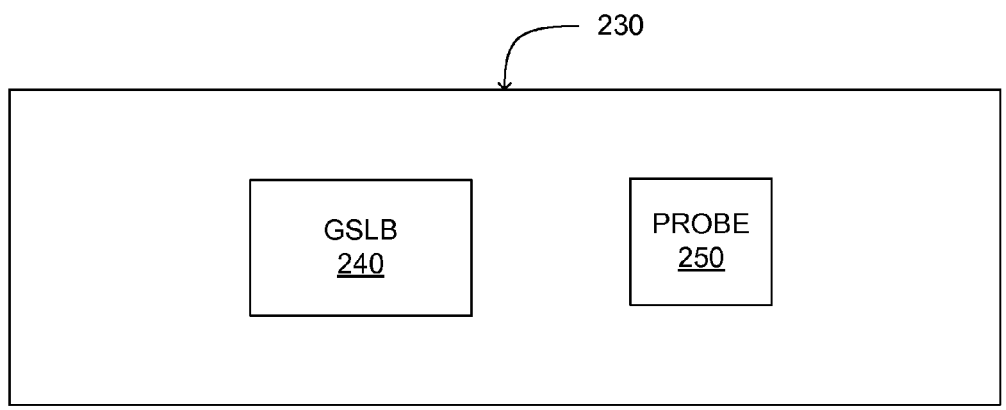
FIG. 2B illustrates services executed by a server of an edge POP in accordance with an embodiment of the present invention.

FIG. 2B illustrates examples of services 230 that are executed via the VIPs 225 on the hosts 220 of a server 210. In one embodiment, the services 230 include a global server load balancer 250 and a probe 260. However, in other embodiments, different and/or additional services may be implemented to run via a VIP 225 of a host 220.

When a server 210 in an edge POP 120 receives a request to resolve for content or to execute an application, GLSB 240 identifies a domain name included in the request and determines a network identifier associated with the domain name. For example, the GSLB 240 determines an Internet Protocol (IP) address associated with a received domain name. While most services 230 are executed using a single unique VIP 225, the GSLB 240 is associated with two VIPs 225. The first VIP 225 associated with the GSLB 240 is an "anycast" address while the second VIP 225 associated with the GSLB 240 is a unicast address. The anycast address associated with the GSLB 240 is returned by a nameserver 140 to a LDNS 115 in response to a request from the LDNS 115 to resolve a domain name. Because each edge POP 120 includes at least one GSLB 240, when the LDNS 115 transmits a domain name resolution request to the anycast address of a GSLB 240, the domain name resolution request is received by the GSLB 240 in the edge POP 120 having the shortest network distance to the LDNS 115. In one embodiment, the GSLB 240 includes data describing the round-trip time (RTT) of data communication between various LDNSes 115 and various edge POPS 120.

For example, the GSLB 240 stores a table of size M×N, where M is an integer number of edge POPS 120 included in the content delivery network (CDN) 102 and N is an integer number of LDNS' 115 accessing the CDN 102, so each entry in the table indicates the RTT between a pairing of an edge POP 120 and a LDNS 115.

On the other hand, identifying a GSLB 240 by its unicast address causes transmission of a domain name resolution request to the GSLB 240 included in the edge POP 120 including the specific VIP 225 that is the unicast address. Thus, use of the anycast address directs a domain name resolution request to a GSLB 240 in an edge POP 120 having a shortest network distance to the LDNS 115 requesting domain name resolution, while use of the unicast address directs the domain name resolution request to a specific GSLB 240 in the edge POP 120 that includes the VIP 225 that is the unicast address.

The probe 240 calculates latency between a LDNS 115 and an edge POP 120 and communicates the latency to the GSLB 240. For example, the probe 240 determines a round-trip time (RTT) between a LDNS 115 and an edge POP 120. In one embodiment, the probe may use one or more conventional techniques such as ping, traceroute, reverse DNS lookup or opening a Transmission Control Protocol (TCP) connection to capture data describing RTT between a LDNS 115 and an edge POP 120. However, rather than rely on the probe 260, in the embodiments of the present invention, the GSLB 240 obtains additional data describing RTT between a LDNS 115 and an edge POP 120 using a canonical name (CNAME) record. For example, the GSLB 240 generates a CNAME record including a timestamp in response to receiving a request to resolve a domain name from an LDNS 115 and determining that the GSLB 240 does not include data describing the RTT between the LDNS 115 and the edge POP 120 including the GSLB 240. The CNAME record is transmitted from the GSLB 240 to the LDNS 115 and the timestamp included in the CNAME record indicates the time when the CNAME record is transmitted to the LDNS 115. To resolve the CNAME record, the LDNS 115 transmits a second domain name resolution request to the GSLB 240. The GSLB 240 then extracts the timestamp included in the CNAME record from the second domain name resolution request and determines the RTT time based on the extracted timestamp and the time when the GSLB received the second domain name resolution request. This use of a CNAME record to determine RTT time between an edge POP 120 and a LDNS 115 is further described below in conjunction with FIGS. 3-5.

Calculation of Round-Trip Time Using a Canonical Name Record

Figure 3:
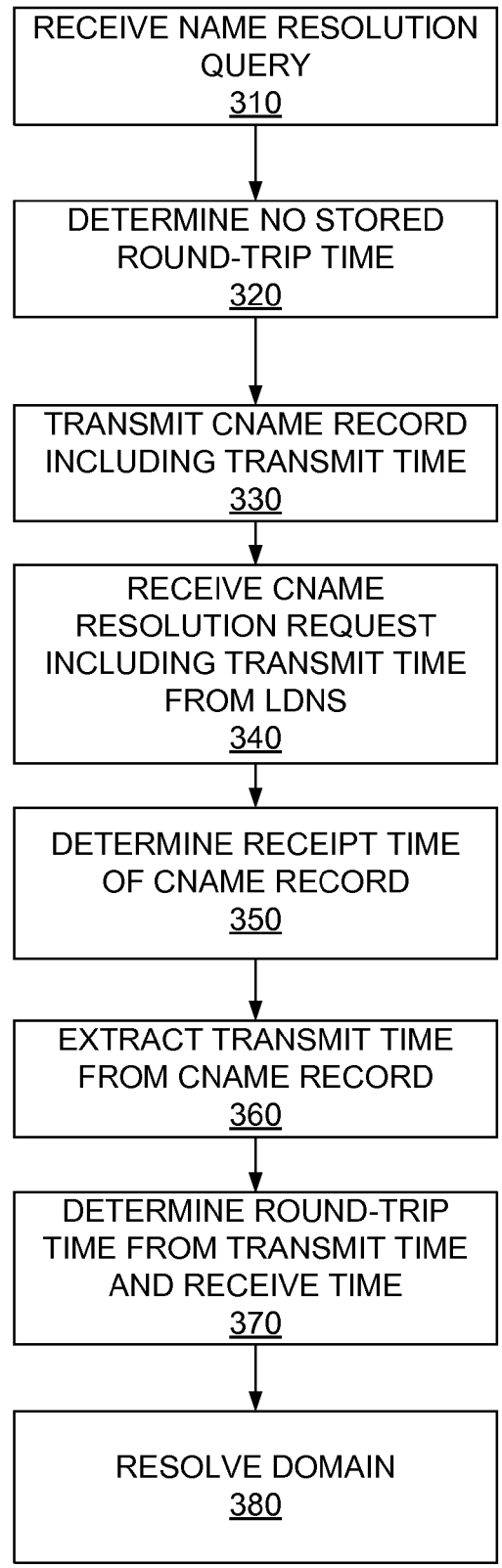
FIG. 3 is a flow chart illustrating a method of round-trip time (RTT) calculation using transmission and resolution of a canonical name (CNAME) record in accordance with an embodiment of the present invention.

FIG. 3 is a flow chart illustrating a method of calculating round-trip time (RTT) between a LDNS 115 and an edge POP 120 using resolution of a canonical name (CNAME) record in accordance with an embodiment of the present invention. When a client device 110 requests content from a domain name, a LDNS 115 receives a request to resolve the domain name and communicates the domain name resolution request to a nameserver 140 for resolution, and the nameserver 140 identifies to the LDNS 115 an authoritative nameserver associated with the domain name for resolving the domain name. The authoritative nameserver associated with the domain name may be an anycast address associated with a GSLB 240. An edge POP 120 including the GSLB 240 then receives 310 the request to resolve the domain name.

The GSLB 240 then determines 320 if data is stored describing the RTT between the LDNS 115 and the edge POP 120 including the GSLB 240. If the GSLB 240 does not include stored RTT data, the GSLB 240 transmits 330 a canonical name (CNAME) record back to the LDNS 115. The CNAME record includes a timestamp indicating a first time (T1) when the CNAME record is transmitted 330 and also includes data identifying the authoritative nameserver for the CNAME record as the GSLB 240 included in the edge POP 120. For example, the CNAME record includes data identifying a unicast address associated with the GSLB 240 included in the edge POP 120 as the authoritative nameserver for the CNAME record.

Because the CNAME record indicates the unicast address associated with the GSLB 240 in the edge POP 120 as the authoritative nameserver for the CNAME record, when the LDNS 115 attempts to resolve the CNAME record, the same GSLB 240 in the edge POP 120 that received 310 the initial request to resolve the domain name receives 340 a second domain name resolution request, and is thus able to determine 350 a second time (T2) when the second domain resolution request is received. This second domain name resolution request is a request to resolve the CNAME record including the timestamp. The GSLB 240 in the edge POP 120 extracts 360 the timestamp from the CNAME record, and determines 370 the RTT from the LDNS 115 to the edge POP 120 including the GLSB 240 from the timestamp indicating the first time when the CNAME record is transmitted 330 and the second time when the second domain resolution request was received. For example, the GSLB 240 subtracts the timestamp (T1) extracted from the CNAME record from the second time (T2) when the request to resolve the CNAME record was received (i.e., when the second domain name resolution request was received), and stores the difference as the RTT between the LDNS 115 and the edge POP 120 including the GSLB 240. That is, RTT=(T2−T1). In addition to determining 370 the RTT time, the GSLB 240 also resolves 380 the originally requested domain name and provides a network identifier associated with the resolved domain name to the LDNS 115. Calculation of RTT by resolving a generated CNAME record is further described below in conjunction with FIGS. 4 and 5

Figure 4:
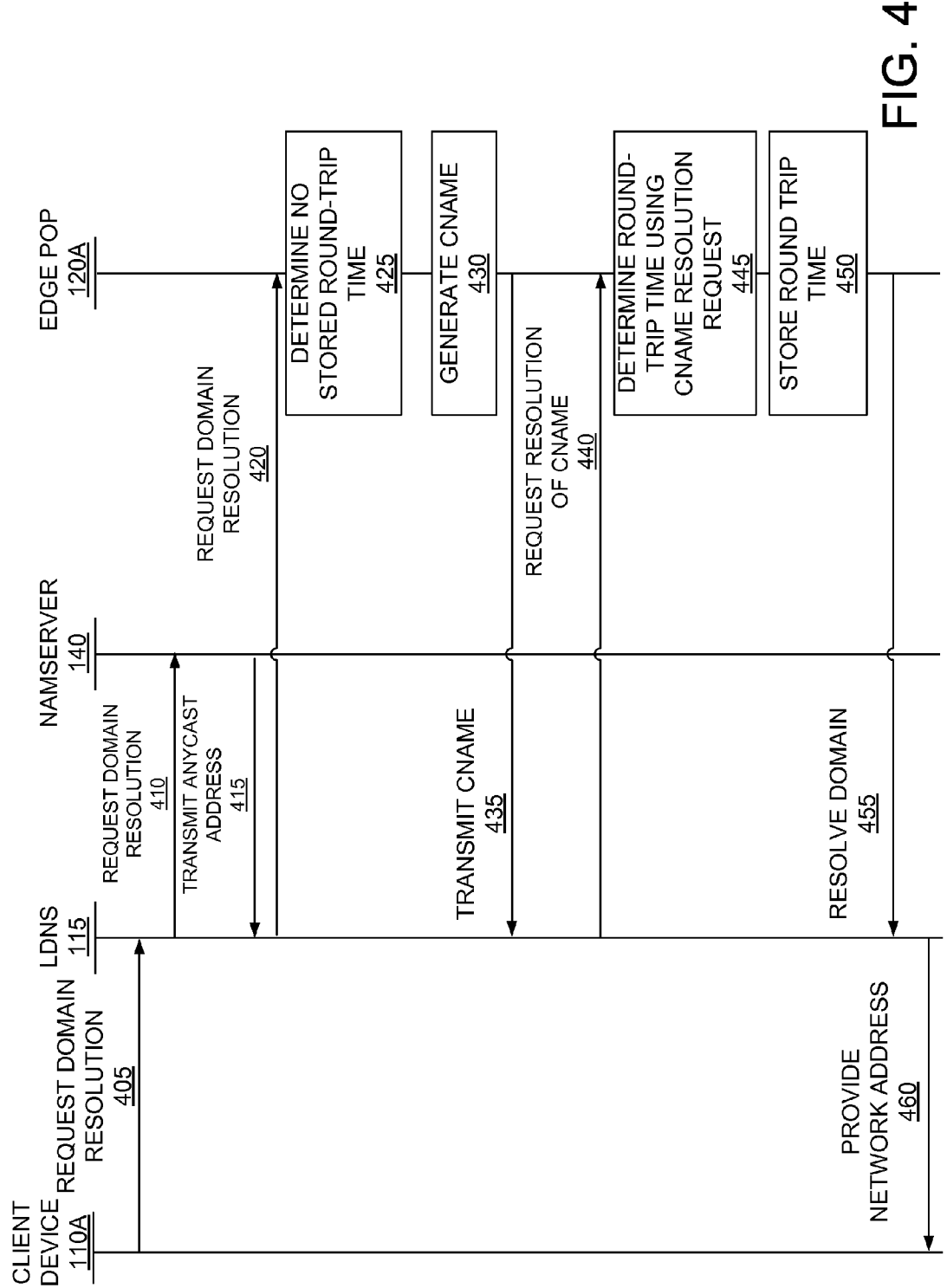
FIG. 4 is an interaction diagram illustrating use of CNAME resolution to determine RTT between a LDNS and an edge point of presence (POP) in a CDN in accordance with an embodiment of the present invention.

FIG. 4 is an interaction diagram illustrating determination of round-trip time (RTT) between a LDNS 115 and an edge point of presence (POP) 120 in a content delivery network (CDN) 120, according to one embodiment of the present invention. In other embodiments, different and/or additional steps than those shown in FIG. 4 may be used.

Initially, a client device 110A requests 405 resolution of a domain name by transmitting a request including the domain name to a local domain name server (LDNS) 115, which requests 410 resolution of the domain name to a nameserver 140. For example, the client device 110A receives a request to retrieve a web page from a domain name, so the client device 110A requests 405 resolution of the domain name by the LDNS 115. The LDNS 115 in turn requests 410 resolution of the domain name by a nameserver 140 associated with the domain name. The nameserver 140 determines a network identifier, such as an Internet Protocol (IP) address, associated with an authoritative nameserver associated with the domain name and transmits 415 the network identifier to the LDNS 115. In one embodiment, the network identifier associated with the authoritative nameserver is an anycast address associated with a global server load balancer (GSLB) 240 included in one or more edge POPs 120 in the CDN 102.

After receiving the network identifier associated with the authoritative nameserver, the LDNS 115 requests 420 resolution of the domain name by the authoritative nameserver. In the embodiment shown by FIG. 4, the network identifier associated with the authoritative nameserver is an anycast address of a GSLB 240 in the edge POPs. Because each edge POP 120 includes at least one GSLB 240, when the LDNS 115 requests 420 resolution of the domain name by the edge POPs, one edge POP 120A having the shortest network distance to the LDNS 115 may receive the request 420 to resolve the domain name. Upon receiving the domain name resolution request, the GSLB 240 included in the edge POP 120A determines 425 whether round-trip time data describing communication latency between the LDNS 115 and the edge POP 120 is stored. For example, the GSLB 240 determines 425 whether a stored table of size M×N includes an entry describing RTT between the edge particular POP 120A and the particular LDNS 115 at its corresponding row and column of the RTT table, where M is the number of edge POPS 120 included in the content delivery network (CDN) 102 and N is the number of LDNS' 115 accessing the CDN 102.

If the GSLB 240 determines 425 that RTT data between the edge POP 120A and the LDNS 115 is not stored, the GSLB 240 in the edge POP 120A generates 430 a canonical name (CNAME) record corresponding to the domain name and transmits 435 the CNAME record to the LDNS 115. The generated CNAME record includes a timestamp indicating a first time (T1) when the CNAME record is transmitted 435 from the edge POP 120A including the GSLB 240 to the LDNS 115. Additionally, the CNAME record and also includes data identifying the authoritative nameserver for the CNAME record as the GSLB 240 included in the edge POP 120A. For example, the CNAME record identifies a unicast address associated with the GSLB 240 included in the edge POP 120A as the authoritative nameserver for the CNAME record, so that a subsequent request to resolve the CNAME record is transmitted to the same GSLB 240 included in the edge POP 120A that generated 430 the CNAME record. In one embodiment, the generated CNAME record may have a format of "transmit_timestamp.delimiter.domain1.POP identifier.domain2," where "transmit_timestamp" indicates the time (T1) when the CNAME record is transmitted from edge POP 120A to LDNS 115, "delimiter" is a predetermined character, or string of characters, used to differentiate the timestamp from the remainder of the CNAME record, "POP_identifier" is an identifier uniquely associated with the edge POP 120A including the GSLB 240 generating the CNAME record, and "domain2" and "domain2" represent portions of the original domain name to be resolved.

After receiving the CNAME record, the LDNS 115 then requests 440 resolution of the CNAME record by transmitting a request for resolution of the CNAME record. Because the CNAME record includes data identifying the authoritative nameserver associated with the CNAME record as the edge POP 120A, the LDNS 115 requests 440 resolution of the CNAME record by the same GSLB 240 in the edge POP 120A that generated 430 the CNAME record. For example, the CNAME record includes the unicast address associated with the GSLB 240 in the edge POP 120A to ensure that edge POP 120A is used to resolve the CNAME record.

In response to receiving the request to resolve the CNAME record, the GLSB 240 in the edge POP 120A identifies a time (T2) when the request to resolve the CNAME record was received and begins resolving the CNAME record. During resolution of the CNAME record, the GSLB 240 in the edge POP 120A determines that the CNAME record is used to calculate RTT. In one embodiment, the GSLB 240 in the edge POP 120A determines a CNAME record is used for RTT calculation when a sub-domain in the CNAME record includes an identifier associated with the edge POP 120A. For example, if the GSLB 240 in the edge POP 120A identifies a sub-domain of "POP_identifier.domain2" in the CNAME record, where "POP_identifier" is an identifier associated with the edge POP 120A, the CNAME record is used for RTT calculation.

To determine 445 round-trip time between the edge POP 120A and the LDNS 115, the GSLB in the edge POP 120A extracts the timestamp (T1) from the CNAME record and determines the difference between the timestamp (T1) from the CNAME record and the time (T2) when the request to resolve the CNAME record was received. In one embodiment, the GSLB 240 in the edge POP 120A extracts the timestamp (T1) by identifying one or more delimiter characters in the CNAME record and using the location of data in the CNAME record relative to the one or more delimiter characters to extract the timestamp (T1). For example, if the CNAME record has the format "transmit_timestamp.delimiter. domain1.POP_identifier.domain2," the GSLB 120A in the edge POP 120 identifies the "delimiter" and extracts data to the left of the "delimiter" as the timestamp (T1). In one embodiment, after extracting the timestamp (T1) from the CNAME record, the GSLB 240 in the edge POP 120 determines 445 the RTT from the LDNS 115 to the edge POP 120 including the GLSB 240 by subtracting the timestamp (T1) from the CNAME record from the time (T2) when the request to resolve the CNAME record was received. That is, RTT= (T2−T1). The GSLB 240 included in the edge POP 120A then stores 450 the calculated RTT and resolves 455 the originally requested domain name. In one embodiment, the GSLB 120 in the edge POP 120A reconstructs the originally requested domain name by modifying the CNAME record. For example, the GSLB 240 in the edge POP 120A removes the timestamp and the POP identifier from the CNAME record to identify the domain name (comprised of domain1 and domain2) to be resolved. After resolving 455 the domain name, the GSLB 240 in the edge POP 120A transmits a network identifier associated with the domain name to the LDNS 115, which then provide 460 the network identifier associated with the domain name to the client device 110A. This allows the client device 110A to subsequently retrieve data from the domain using the network identifier.

Figure 5:
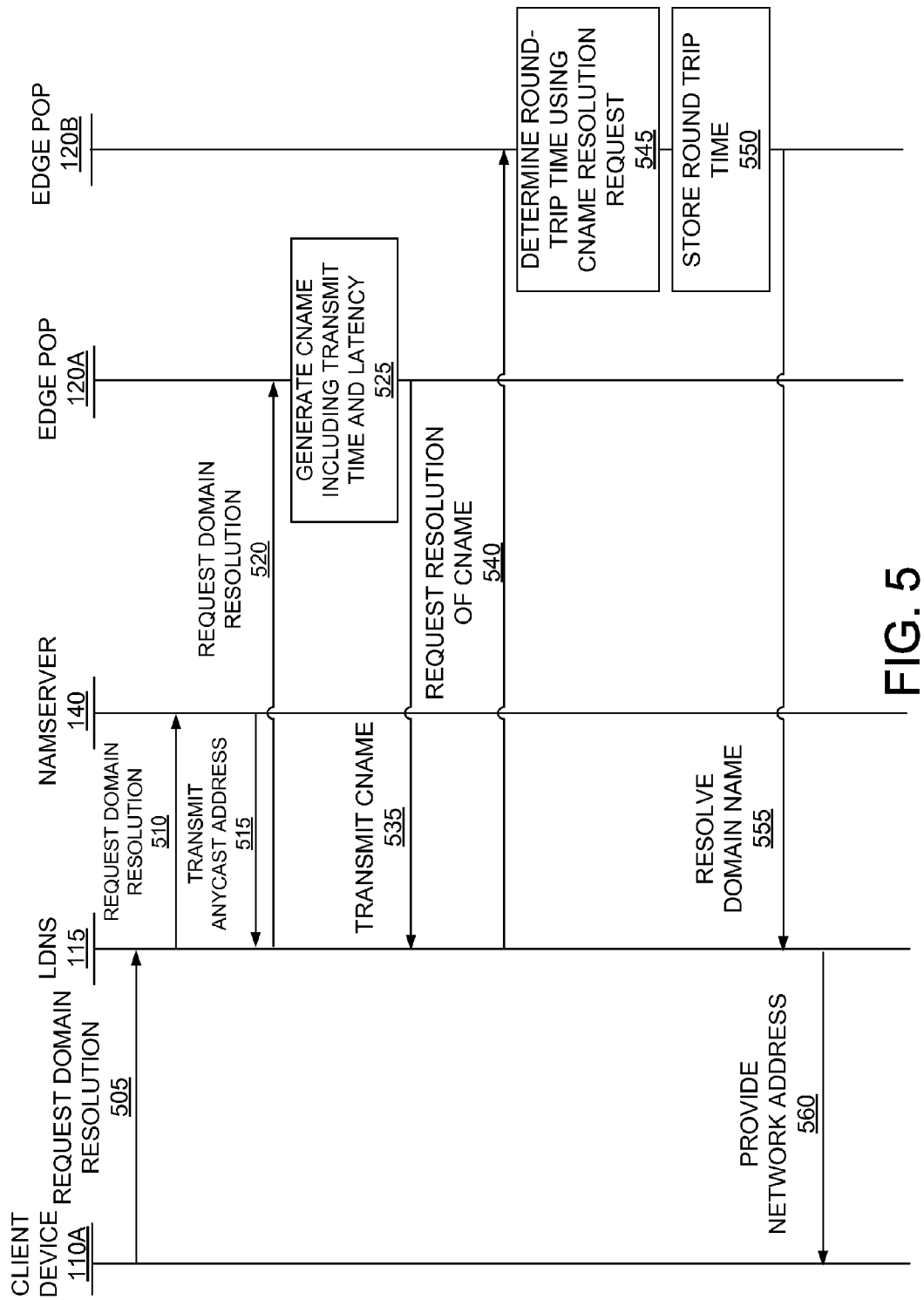
FIG. 5 is an interaction diagram illustrating use of CNAME resolution to determine RTT between a first edge POP and a LDNS and between a second edge POP and the LDNS in accordance with an embodiment of the present invention.

FIG. 5 is an interaction diagram illustrating determination of round-trip time between a local domain name server (LDNS) 114 and a first edge point of presence (POP) 120A and between the LDNS 114 and a second edge POP 120B using resolution of a canonical name (CNAME) record in accordance with an embodiment of the present invention. The embodiment of FIG. 5 applies to the situation where one edge POP 120A has the RTT information between a particular LDNS 115 and itself (edge POP 120A) but the edge POP 120A does not have RTT information between the LDNS 115 and another edge POP, for example, edge POP 120B, in its RTT table. The edge POP 120A uses CNAME records as will be described with reference to FIG. 5 to have the other edge POP 120B determine its RTT between LDNS 115 and edge POP 120B, which RTT information can be propagated to other edge POPs including edge POP 120A to add to the existing RTT information in the RTT table. In other embodiments, different and/or additional steps than those shown in FIG. 5 may be used.

Initially, a client device 110A requests 505 resolution of a domain name by transmitting a request including the domain name to a local domain name server (LDNS) 115, which requests 510 resolution of the domain name from a nameserver 140. For example, the client device 110A receives a request to retrieve a web page from a domain name, so the client device 110A requests 505 resolution of the domain name by the LDNS 115. The LDNS 115 in turn requests 510 resolution of the domain name by a nameserver 140 associated with the domain name. The nameserver 140 determines a network identifier, such as an Internet Protocol (IP) address, associated with an authoritative nameserver associated with the domain name and transmits 515 the network identifier to the LDNS 115. In one embodiment, the network identifier associated with the authoritative nameserver is an anycast address associated with a global server load balancer (GSLB) 240 included in one or more edge POPs 120 in the CDN 102.

After receiving the network identifier associated with the authoritative nameserver, the LDNS 115 requests 520 resolution of the domain name by the authoritative nameserver. In the embodiment shown by FIG. 5, the network identifier associated with the authoritative nameserver is an anycast address of a GSLB 240. Because each edge POP 120 includes at least one GSLB 240, when the LDNS 115 requests 520 resolution of the domain name, the request is received by the edge POP 120A having the shortest network distance to the LDNS 115. In the example of FIG. 5, the first edge POP 120A has the shortest network distance to the LDNS 115. Upon receiving the domain name resolution request, the GSLB 240 included in the first edge POP 120A determines that round-trip time (RTT) data describing communication between the LDNS 115 and the first edge POP 120A is stored, but that data describing communication between the LDNS 115 and the second edge POP 120B is not stored. Rather than resolve the domain name, the GSLB 240 included in the first edge POP 120A generates 525 a canonical name (CNAME) record used to determine the RTT between the LDNS 115 and the second edge POP 120B.

The CNAME record generated 525 by the first edge POP 120A includes the one-way latency (L) between the first edge POP 120A and the LDNS 115 in addition to a timestamp (T3) indicating a first time when the CNAME record is transmitted 535 from the first edge POP 120A including the GSLB 240 to the LDNS 115. To determine the one-way latency (L) between the first edge POP 120A and the LDNS 115, the GSLB 240 in the first edge POP 120A divides the stored RTT between the first edge POP 120A and the LDNS 115 by two, i.e., L=RTT/2. Additionally, the generated CNAME record and also includes data identifying the authoritative nameserver for the CNAME record as the GSLB 240 included in the second edge POP 120B. For example, the CNAME record identifies a unicast address associated with the GSLB 240 included in the second POP 120B as the authoritative nameserver for the CNAME record. This causes the LDNS 115 to request 540 resolution of the CNAME record by the GSLB 240 included in the second edge POP 120B. In one embodiment, the generated CNAME record may have a format of "latency.transmit_timestamp. delimiter.domain1.POP_identifier.domain2," where "latency" is the one-way latency (L) between the first edge POP 120A and the LDNS 115, "transmit_timestamp" indicates the time (T3) when the CNAME record is transmitted from edge POP 120A to LDNS 115, "delimiter" is a predetermined character, or string of characters, used to differentiate the timestamp from the remainder of the CNAME record, "POP_identifier" is an identifier uniquely associated with the second edge POP 120B, and "domain1" and "domain2" represent portions of the domain name to be resolved.

Hence, the LDNS 115 requests 540 resolution of the CNAME request by the GSLB 240 included in the second edge POP 120B by transmitting a request for resolution of the CNAME record to the second edge POP 120B. In response to receiving the request to resolve the CNAME record, the GLSB 240 in the second edge POP 120B identifies the time (T4) when the request to resolve the CNAME record was received and begins resolving the CNAME record. As the CNAME record is resolved, the GSLB 240 in the second edge POP 120B determines that the CNAME record is used to calculate RTT. In one embodiment, the GSLB 240 in the second edge POP 120B determines a CNAME record is used for RTT calculation when a sub-domain in the CNAME record includes an identifier associated with the second edge POP 120B. For example, if the GSLB 240 in the edge POP 120A identifies a sub-domain of "POP identifier.domain2" in the CNAME record, where "POP_identifier" is an identifier associated with the second edge POP 120B, the CNAME record is used for RTT calculation. Additionally, during resolution of the CNAME record, the GSLB in the second edge POP 120B determines that the CNAME record includes two timestamps (L, T3) and determines that the CNAME record originated from a GLSB 240 in a different edge POP 120.

Using the CNAME request, the GSLB 240 in the second edge POP 120B determines 445 round-trip time (RTT) between the second edge POP 120B and the LDNS 115 using the latency (L) and timestamp (T3) extracted from the CNAME record and the time (T4) when the GSLB 240 included in the second edge POP 120B received the request to resolve the CNAME record. In one embodiment, the GSLB 240 in the edge POP 120A extracts the timestamp (T3) and the latency (L) by identifying one or more delimiter characters in the CNAME record and using the location of data in the CNAME record relative to the one or more delimiter characters to extract the timestamp and the latency data, as described above in conjunction with FIG. 4. In one embodiment, the RTT between the second edge POP 120B and the LDNS 115 is determined by subtracting the latency (L)and the timestamp (T3) extracted from the CNAME record from the time (T4) when the GSLB 240 included in the second edge POP 120B received the request to resolve the CNAME record, and multiplying the resulting value by two, i.e., RTT=(T4−T3−L)×2. The GSLB 240 included in the second edge POP 120B then stores 550 the calculated RTT and resolves 455 the originally requested domain name. The GSLB 240 included in the second edge POP 120B may also transmit the RTT to GSLBs 240 included in other edge POPs 120. In one embodiment, the GSLB 120 in the second edge POP 120B reconstructs the originally requested domain name by modifying the CNAME record. For example, the GSLB 240 in the second edge POP 120B removes the timestamp and the POP identifier from the CNAME record to identify the domain name to be resolved. After resolving 555 the domain name, the GSLB 240 in the second edge POP 120B transmits a network identifier associated with the domain name to the LDNS 115, which then provides 560 the network identifier associated with the domain name to the client device 110A. This allows the client device 110A to subsequently retrieve data from the domain name using the network identifier.

As described above, each edge POP 120A may fill in the RTT table it maintains by determining the RTT time between itself and the LDNS 115 and also by receiving thee RTT information between another edge POP 120B and the LDNS 115 or other LDNS' that is propagated by such other edge POPs 120B throughout the CDN. Thus, when each edge POP 120 performs the processes described in FIGS. 4 and 5 to determine the RTT between itself and the LDNS' and propagates the RTT information to the other edge POPs, each edge POP will eventually be able to add RTT information to all entries of the M×N RTT table substantially completely within a practical amount of time.

In one embodiment, each edge POP may maintain the RTT between all edge PoPs and all LDNS clients in the RTT table and measure the RTT to a LDNS client every time the edge POP receives a DNS query from the LDNS. However, such approach has some practical limitations. Since there can be hundreds of edge PoPs and millions of LDNS', the size of the RTT table will be extremely large. For performance reasons, the RTT table will be stored in memory, and a large RTT table will incur the cost overhead of having a large size memory. Further, it may be impractical to conduct a RTT measurement for every query received from a LDNS, because determining RTT according to the embodiments of FIGS. 4 and 5 introduces an extra round of resolution (due to CNAME'ing), thereby introducing a time overhead in the query resolution process.

In order to overcome such limitations, the above-described process of FIGS. 4 and 5 for determining RTT in the CDN may be optimized in a variety of ways. For example, a Time-to-live (TTL) parameter may be introduced to the RTT information. That is, in one embodiment, each RTT value in the RTT table may be associated with a TTL value which defines the validity of the RTT value for a certain period of time. The TTL value may be a configurable parameter. Initially, when there are no values in the RTTtable [X, C] for the RTT between LDNS C and edge POP X, the RTT is measured according to the embodiment of FIG. 4. However, subsequently the RTT between edge PoP X and LDNS C may be measured only when both the corresponding TTL has expired and a DNS request is received from LDNS C.

For another example, it is also possible to reduce the number of PoPs for which a GSLB maintains the RTT values to all LDNS clients. The objective is to maintain the RTT to m PoPs, instead of M, where m<<M, based on the following observation. The core idea of a content distribution network is to serve content from a server that is very close to the user in order to accelerate his/her Web experience. As such, for a given user, only the PoPs that are in network proximity will likely be serving content. Thus, RTT between the LDNS of the user and the PoPs that are close to it is sufficient for running the CDN's load balancing algorithm at the GSLB. Recall that edge PoP X will receive a query from LDNS C using IP anycast, which selects a destination from a group based on network proximity. Thus it can be safely assumed that edge PoP X will be very close to LDNS C in terms of network proximity. Thus, in one embodiment, the RTT is measured between LDNS C and only a small subset of the edge PoPs that are proximate to edge PoP X. Network proximity may be determined by geographic proximity, autonomous system (AS)-based (i.e., whether IP addresses belong to the same AS such as the same ISP or organization), and/or border gateway protocol (BGP)-based (i.e., based on the BGP routing policy).

For still another example, it is possible to limit the number of LDNS clients for which a GSLB maintains the M×N RTT. The objective is to maintain the RTT for n clients where n<<N. This is based on the assumption that due to IP anycast, a GSLB will receive requests only from LDNS clients that are close to it. Again, network proximity may be determined by geographic proximity, autonomous system (AS)-based (i.e., whether IP addresses belong to the same AS such as the same ISP or organization), and/or border gateway protocol (BGP)-based (i.e., based on the BGP routing policy).

Application of the last two optimizations described above may reduce the RTT table size from M×N down to m×n. This significantly reduces the memory size needed in the edge PoPs and hence the cost overhead. In addition, it also reduces the average time overhead of the query resolution process, because the GSLB in PoP X will redirect the client requests to only m edge PoPs, instead of M edge PoPs. While this does not reduce the overhead of the specific DNS resolution request that is being redirected, it reduces the average overhead. This becomes clear from the following example. Let R be the total number of requests received from a LDNS client C. Let t1 be the average time to resolve a query without CNAME'ing for RTT calculation. Let t2 be the average time to resolve a query with CNAME'ing, where t2>t1. Let p be the number of edge PoPs to which the RTT is measured. With the optimizations described above, p DNS requests out of a total of R DNS requests will be CNAME'ed according to the method of the present invention and each will have DNS resolution time of t2. The remaining DNS requests will be resolved directly without CNAME'ing and will have a resolution time of t1. Then the average query resolution time (t_avg) is given by: $t\_avg=(t1\times(R-p)+t2\times p)/R$. If t1=5 ms, t2=20 ms, there are R=1,000 requests of which the RTT to p=10 edge PoPs is measured, then the average query resolution time (t_avg) is 5.15 ms. If the RTT to p=100 edge PoPs is measured, then the average query resolution time (t_avg) is 6.5 ms. Thus the average query resolution time for measuring the RTT to 100 edge PoPs is 25% more than that for measuring the RTT to 10 edge PoPs.

Example Server Architecture

Figure 6:
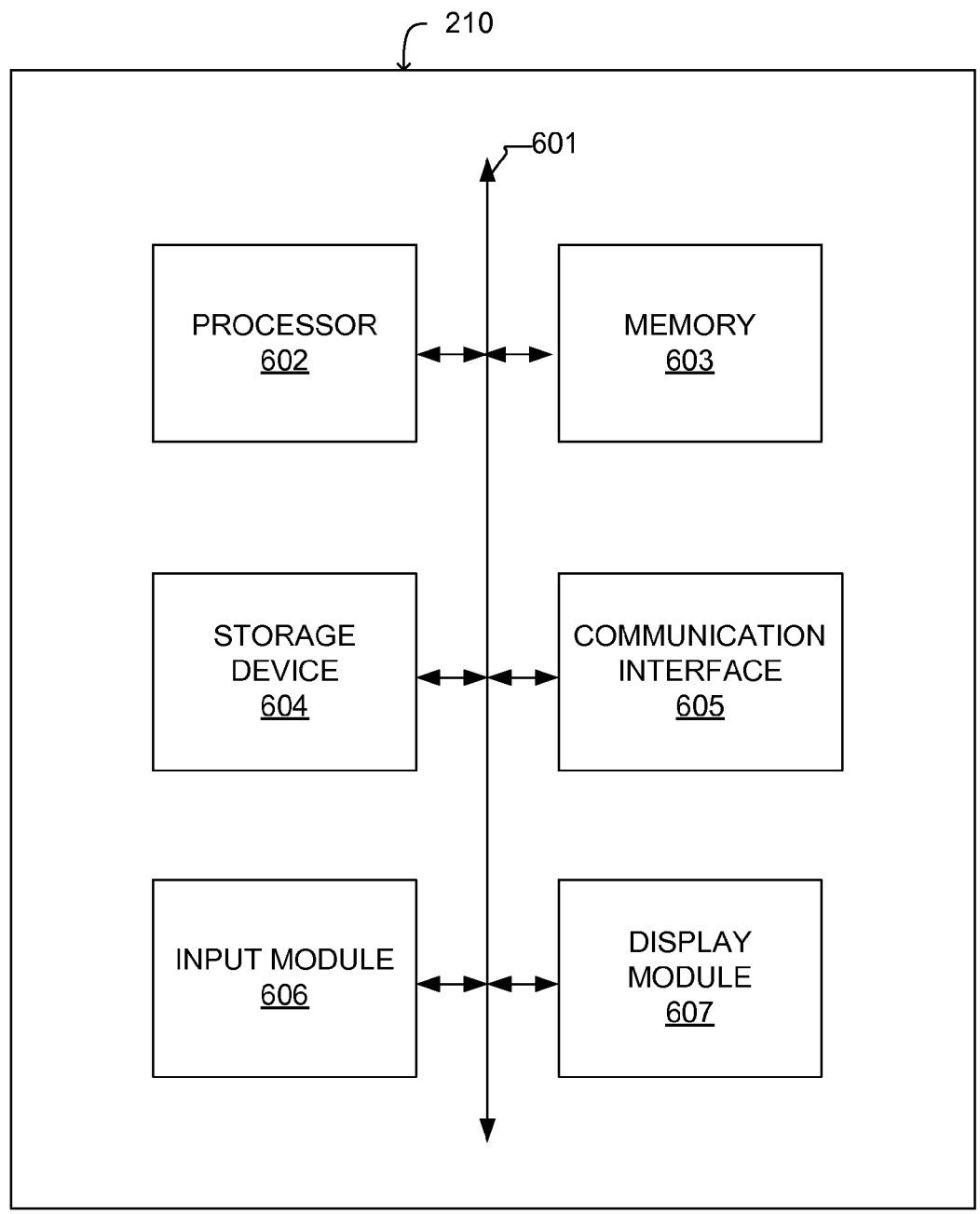
FIG. 6 is a block diagram illustrating the hardware architecture of a cache server in accordance with an embodiment of the present invention.

FIG. 6 illustrates the hardware architecture of a server 210, according to one embodiment of the present invention. In one embodiment, the server 210 is a server computer including components such as a processor 602, a memory 603, a storage device 604, an input module (e.g., keyboard, mouse, and the like) 606, a display module 607 and a communication interface 605, exchanging data and control signals with one another through a bus 601. The storage device 604 is implemented as one or more computer readable storage media (e.g., hard disk drive), and stores software that is run by the processor 602 in conjunction with the memory 603 to implement the distributed data cache 130 and other functionality as described herein. Operating system software and other application software may also be stored in the storage device 604 to run on the processor 602. Note that not all components of the server 210 are shown in FIG. 6 and that certain components not necessary for illustration of the present invention are omitted herein.

Figure 7:
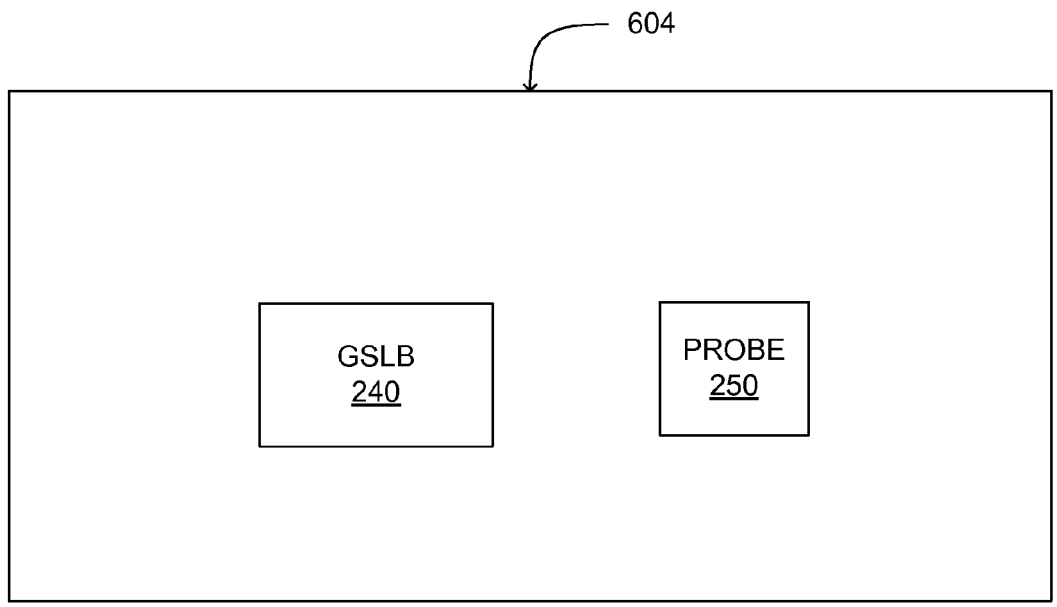
FIG. 7 shows a storage device of a cache server storing various functional software modules in accordance with an embodiment of the present invention.

FIG. 7 illustrates the storage device 604 of a server 210 storing various software modules for execution by the server 210, including a global server load balancer (GSLB) 240 and a probe 250.

As can be seen from the description above, the embodiments herein allow more accurate determination of round-trip time (RTT) between various edge POPs 120 in a CDN 102 and an LDNS 115 used by one or more client devices 110. Determining RTT time based on resolution of canonical name (CNAME) records increases the accuracy of RTT calculation by allowing capture of RTT data even when conventional techniques for RTT calculation are ineffective. This increases the accuracy of RTT data stored by GLSBs 240 in multiple edge POPS 120, enabling the GSLBs 240 to more accurately balance the load processed by different GSLBs 240 to reduce the network latency for data retrieval by one or more client devices 110.

Upon reading this disclosure, those of skill in the art will appreciate still additional alternative designs for calculating round-trip time between edge points of presence in a CDN and local domain name servers accessing the edge points of presence. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a content delivery network including a plurality of servers included in one or more edge points of presence (edge POPs), a computer-implemented method comprising:
   receiving, at a first server in a first edge POP, a request to resolve a domain name from a local domain name server associated with a client computer;
   transmitting a canonical name (CNAME) record including a timestamp to the local domain name server, the timestamp indicating a first time when the CNAME record is transmitted;
   receiving a request to resolve the CNAME record from the local domain name server, the request including the timestamp indicating the first time; and
   determining a round-trip time for round-trip transmission between the local domain name server and the first server on the first edge POP based upon a second time when the request to resolve the CNAME record is received from the local domain name server and the first time indicated by the timestamp.

2. The method of claim 1, further comprising:
   storing the round-trip time in association with data identifying a pair of the first edge POP and the local domain name server in a computer-readable storage medium included in the first server.

3. The method of claim 1, the round-trip time for round-trip transmission between the local domain name server and the first server on the first edge POP is determined only if a time-to-live associated with the round-trip time expired.

4. The method of claim 1, wherein transmitting a CNAME record to the local domain name server comprises:
   adding the timestamp and a delimiter to the domain name received from the local domain name server, the delimiter separating the timestamp from the domain name.

5. The method of claim 4, wherein determining the round-trip time comprises:
   parsing the request to resolve the CNAME record;
   responsive to identifying the delimiter, extracting the timestamp from the CNAME record to determine the first time; and
   subtracting the first time from the second time to determine the round-trip time.

6. The method of claim 1, the round-trip time for round-trip transmission between the local domain name server and the first server on the first edge POP is determined only if the local domain name server and the first server are proximate to each other according to predetermined proximity criteria.

7. The method of claim 1, further comprising:
   propagating the round-trip time in association with data identifying a pair of the first edge POP and the local domain name server to a second server in a second edge POP.

8. The method of claim 1, wherein the CNAME record further includes a unicast address associated with a unique network identifier associated with the first server.

9. A server of a content delivery network including at least a processor and a computer readable storage medium storing computer instructions configured to cause the processor to perform a computer-implemented method of calculating round-trip transmission between the server and a local domain name server, the method comprising:
   receiving, at the server in a first edge point of presence (PoP), a request to resolve a domain name from the local domain name server associated with a client computer;
   transmitting a canonical name (CNAME) record including a timestamp to the local domain name server, the timestamp indicating a first time when the CNAME record is transmitted;
   receiving a request to resolve the CNAME record from the local domain name server, the request including the timestamp indicating the first time; and
   determining a round-trip time for round-trip transmission between the local domain name server and the server based upon a second time when the request to resolve the CNAME record is received from the local domain name server and the first time indicated by the timestamp.

10. The server of claim 9, wherein the computer readable storage medium further stores computer instructions configured to cause the processor to:
    store the round-trip time in association with data identifying a pair of the first edge PoP including the server and the local domain name server in a computer-readable storage media included in the server.

11. The server of claim 9, wherein the computer readable storage medium further stores computer instructions configured to cause the processor to determine the round-trip time for round-trip transmission between the local domain name server and the server on the first edge POP only if a time-to-live associated with the round-trip time expired.

12. The server of claim 9, wherein transmitting a CNAME record to the local domain name server comprises:
    adding the timestamp and a delimiter to the domain name received from the local domain name server, the delimiter separating the timestamp from the domain name.

13. The server of claim 12, wherein determining the round-trip time comprises:
    parsing the request to resolve the CNAME record;
    responsive to identifying the delimiter, extracting the timestamp from the CNAME record to determine the first time; and
    subtracting the first time from the second time to determine the round trip time.

14. The server of claim 9, wherein the computer readable storage medium further stores computer instructions configured to cause the processor to determine the round-trip time for round-trip transmission between the local domain name server and the server on the first edge POP only if the local domain name server and the server are proximate to each other according to predetermined proximity criteria.

15. The server of claim 9, wherein the computer readable storage medium further stores computer instructions configured to cause the processor to propagate the round-trip time in association with data identifying a pair of a first edge PoP including the server and the local domain name server to another server in a second edge point of presence.

16. The server of claim 9, wherein the CNAME record further includes a unicast address associated with a unique network identifier associated with the server.

17. A non-transitory computer readable storage medium storing a computer program product including computer instructions configured to cause a processor of a computer to perform a computer-implemented method of calculating round-trip transmission between a server in a first edge point of presence (PoP) in a content delivery network and a local domain name server, the method comprising:
  receiving, at the server, a request to resolve a domain name from the local domain name server associated with a client computer;
  transmitting a canonical name (CNAME) record including a timestamp to the local domain name server, the timestamp indicating a first time when the CNAME record is transmitted;
  receiving a request to resolve the CNAME record from the local domain name server, the CNAME record including the timestamp indicating the first time; and
  determining a round-trip time for round-trip transmission between the local domain name server and the server based upon a second time when the request to resolve the CNAME record is received from the local domain name server and the first time indicated by the timestamp.

18. The computer readable storage medium of claim 17, wherein the computer readable storage medium further stores instructions configured to cause the processor to:
  store the round-trip time in association with data identifying a pair of the first edge PoP including the server and the local domain name server in a computer-readable storage media included in the server.

19. The computer readable storage medium of claim 17, wherein the computer readable storage medium further stores computer instructions configured to cause the processor to determine the round-trip time for round-trip transmission between the local domain name server and the server on the first edge POP only if a time-to-live associated with the round-trip time expired.

20. The computer readable storage medium of claim 17, wherein transmitting a CNAME record to the local domain name server comprises:
  adding the timestamp and a delimiter to the domain name received from the local domain name server, the delimiter separating the timestamp from the domain name.

21. The computer readable storage medium of claim 20, wherein determining the round-trip time comprises:
  parsing the request to resolve the CNAME record;
  responsive to identifying the delimiter, extracting the timestamp from the CNAME record to determine the first time; and
  subtracting the first time from the second time to determine the round trip time.

22. The computer readable storage medium of claim 17, wherein the computer readable storage medium further stores computer instructions configured to cause the processor to determine the round-trip time for round-trip transmission between the local domain name server and the server on the first edge POP only if the local domain name server and the server are proximate to each other according to predetermined proximity criteria.

23. The computer readable storage medium of claim 17, wherein the computer readable storage medium further stores computer instructions configured to cause the processor to propagate the round-trip time in association with data identifying a pair of the first edge PoP including the server and the local domain name server to another server in a second edge point of presence.

24. The computer readable storage medium of claim 17, wherein the CNAME record further includes a unicast address associated with a unique network identifier associated with the server.

25. In a content delivery network including a plurality of servers in one or more edge points of presence (edge POPs), a computer-implemented method comprising:
  receiving, at a first server in a first edge POP, a request to resolve a domain name from a local domain name server associated with a client computer;
  determining a one-way latency time from first round-trip transmission time stored in the first server indicative of a first round-trip transmission between the local domain name server and the first server on the first edge POP, the one-way latency time indicative of latency for unidirectional transmission between the first server on the first edge POP and the local domain name server;
  transmitting a canonical name (CNAME) record including the one-way latency time and a timestamp to the local domain name server, the timestamp indicating a first time when the CNAME record is transmitted and the CNAME record including a network identifier associated with a second server in a second edge POP;
  receiving, at the second server in the second edge POP, a request to resolve the CNAME record from the local domain name server, the request including the timestamp indicating the first time and the one-way latency time; and
  determining a second round-trip time for round-trip transmission between the local domain name server and the second server on the second edge POP based on a second time when the request to resolve the CNAME record is received by the second server from the local domain name server, the first time indicated by the timestamp, and the one-way latency time.

26. The method of claim 25, further comprising:
  storing the second round-trip time in association with data identifying a pair of the second edge POP and the local domain name server in a computer-readable storage media included in the second server.

27. The method of claim 25, further comprising:
  propagating the second round-trip time in association with the data identifying a pair of the second edge POP including the second server and the local domain name server to the first server in the first edge POP.

* * * * *